(12) United States Patent
Rodniansky et al.

(10) Patent No.: US 11,444,923 B2
(45) Date of Patent: Sep. 13, 2022

(54) RUNTIME DETECTION OF DATABASE PROTOCOL METADATA ANOMALIES IN DATABASE CLIENT CONNECTIONS

(71) Applicant: International Business Machines Corporation, Armonk, NY (US)

(72) Inventors: Leonid Rodniansky, Allston, MA (US); Shay Harel, Marlborough, MA (US); Tania Butovsky, Needham, MA (US); Peter Maniatis, Clinton, MA (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 16/942,022

(22) Filed: Jul. 29, 2020

(65) Prior Publication Data
US 2022/0038428 A1    Feb. 3, 2022

(51) Int. Cl.
| H04L 9/40 | (2022.01) |
| G06N 7/00 | (2006.01) |
| G06K 9/62 | (2022.01) |
| G06N 20/00 | (2019.01) |
| G06F 21/62 | (2013.01) |

(52) U.S. Cl.
CPC ...... *H04L 63/0263* (2013.01); *G06F 21/6218* (2013.01); *G06K 9/6278* (2013.01); *G06N 7/005* (2013.01); *G06N 20/00* (2019.01); *H04L 63/1425* (2013.01); *H04L 63/20* (2013.01)

(58) Field of Classification Search
CPC . H04L 63/0263; H04L 63/1425; H04L 63/20; G06N 20/00; G06N 7/005; G06F 21/6218; G06K 9/6278
See application file for complete search history.

(56) References Cited

U.S. PATENT DOCUMENTS

| 10,492,091 B2 | 11/2019 | Kleinbeck et al. |
| 11,349,875 B2 * | 5/2022 | Rodniansky ........ H04L 43/0888 |

(Continued)

FOREIGN PATENT DOCUMENTS

| CN | 102035855 B | 12/2010 |
| CN | 104753946 A | 4/2015 |

(Continued)

*Primary Examiner* — Hee K Song
(74) *Attorney, Agent, or Firm* — Jorge R. Maranto; David H. Judson

(57) ABSTRACT

A database protection system (DPS) detects anomalies in real time without reliance on discrete security rules, instead relying on a machine learning-based approach. In particular, a Bayesian machine learning model is trained on a set of database protocol metadata (DPM) that the system collects during its runtime operation. Typically, a set of DPM parameters is protocol-specific. The approach herein presumes that DPM parameters are not independent, and that their conditional dependencies (as observed from the database connections) can be leveraged for anomaly detection. To that end, the machine learning model is trained to detect dominant (repeating) patterns of connection DPM parameters. Once trained, the model is then instantiated in the DPS and used to facilitate anomaly detection by identifying connections that do not conform to these patterns, i.e. that represent unusual connection DPM parameters.

22 Claims, 6 Drawing Sheets

(56) References Cited

U.S. PATENT DOCUMENTS

| | | | | |
|---|---|---|---|---|
| 2015/0242531 A1* | 8/2015 | Rodniansky | ........ | G06F 21/6218 |
| | | | | 707/782 |
| 2017/0318027 A1* | 11/2017 | Rodniansky | ........ | H04L 63/1425 |
| 2019/0147080 A1* | 5/2019 | Nikitina | ................ | G06F 16/219 |
| | | | | 707/703 |
| 2019/0173909 A1* | 6/2019 | Mixer | ................... | H04L 43/065 |
| 2021/0058429 A1* | 2/2021 | Rodniansky | ........ | H04L 43/0817 |

FOREIGN PATENT DOCUMENTS

| | | | |
|---|---|---|---|
| CN | 108063753 | A | 11/2017 |
| CN | 108229175 | B | 6/2018 |
| WO | 202082853 | A1 | 4/2020 |

\* cited by examiner

RUNTIME DETECTION OF DATABASE PROTOCOL METADATA ANOMALIES IN DATABASE CLIENT CONNECTIONS

BACKGROUND OF THE INVENTION

Technical Field

This disclosure relates generally to securing resources in a distributed computing environment and, in particular, to database access security.

Background of the Related Art

It is known to provide a database protection solution/system (DPS). Systems of this type analyze database access by a client application, typically by monitoring a network or local access to the database server or cloud service, thereby enabling monitoring of transactions to identify suspicious behavior. In a typical solution, an agent (which may be a proxy, or other monitoring functionality) operates to monitor both requests (to the server) and responses (from the server). The requests and responses are forwarded to a security mechanism, which validates transactions against a set of security rules and alerts in runtime when security violations or anomalies are detected. One type of commercially-available DPS is IBM® Guardium® that includes a lightweight software agent (S-TAP) installed on a database server system or provisioned as a proxy between a client application and a cloud service. In a system of this type, the security mechanism typically includes various components, such as a protocol analyzer module, a statements/commands parser, a policy validation module, and an alert module. The security mechanism is configured to examine the requests and the responses. In a database server system, a database query that is sent by the database client application to the database server is extracted from the database protocol packets intercepted by the agent; the security mechanism then parses this query up to a database object level, validates the query against one or more security policies for a potential database object access violation, and issues an appropriate alert if an access violation is detected. The system may also suspend database client connection(s) when a security anomaly or violation is detected.

As described, the DPS has a module that validates a request or response payload against a set of security rules, typically defined by a security administrator. While known DPS approaches such as described above provide significant advantages, it may not be possible to define a security rule set that can detect all forms of anomalous database connections. This is especially true for low probability events, or activity that is outside an expected or known set of access violations. In these scenarios, a malicious database client may be able to access the server.

BRIEF SUMMARY

A database protection system (DPS) is augmented to provide additional functionality to detect in real time anomalies that may not be recognized by a set of security rules that are configured for the system. To this end, and in lieu of using discrete security rules, the system herein implements a machine learning-based approach. According to this disclosure, a machine learning model (e.g., a Bayesian model) is trained on a set of database protocol metadata (DPM) that the system collects during its runtime operation. The database protocol metadata may be quite varied, for example, the identity of which bit is set when a connection belongs to a super user, the particular code location that contains a client time zone, the particular code corresponding to the protocol type or version, a code corresponding to a driver version, and many more. Typically, a set of DPM parameters is protocol-specific (e.g., and dependent on an internal Application Programming Interface (API) that is used to establish the database connection). The approach herein presumes that DPM parameters are not independent, and that their conditional dependencies (as observed from the database connections) can be leveraged for anomaly detection. To that end, the machine learning model is trained to detect dominant (repeating) patterns of connection DPM parameters. Once trained, the model is then instantiated in the DPS and used to facilitate anomaly detection by identifying connections that do not conform to these patterns, i.e. that represent unusual connection DPM parameters. The approach may be used in lieu of or to supplement conventional rule-based approaches that use security rules to search for specific anomalous patterns.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION OF AN ILLUSTRATIVE EMBODIMENT

Figure 1:
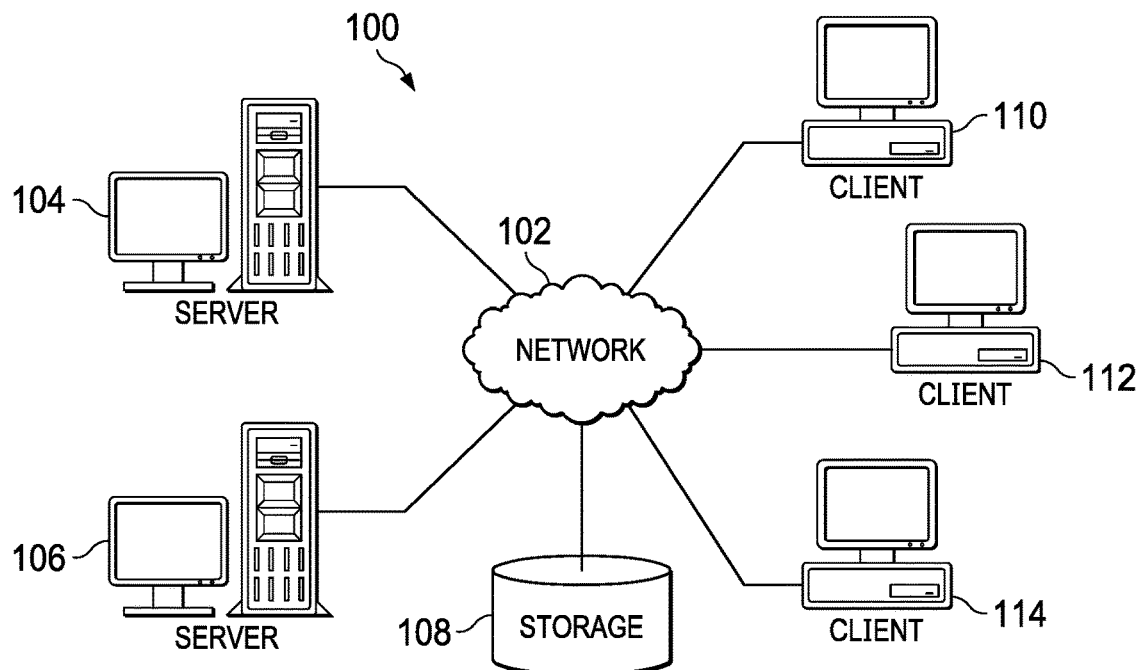
FIG. 1 depicts an exemplary block diagram of a distributed data processing environment in which exemplary aspects of the illustrative embodiments may be implemented.
Figure 2:
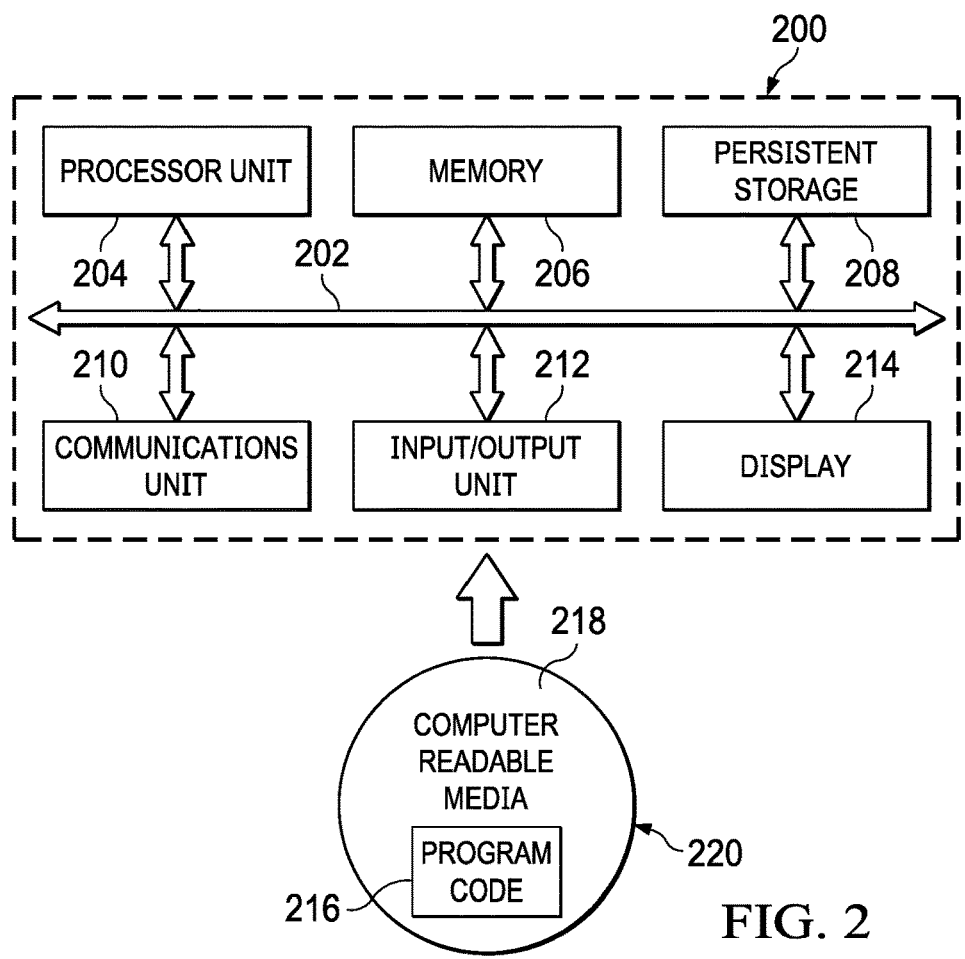
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the symmetric multi-processing (SMP) system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

In a representative but non-limiting implementation, the techniques herein are described in the context of a transaction-processing system or environment that comprises distributed and mainframe components, working cooperatively to respond to HTTP and Web Service client end-user service or transaction requests. Such a system or environment typically comprises multiple components, configured in a distributed manner. A distributed component of a larger multi-component transaction-processing environment typically comprises at least a computer, operating system platform, applications, networking and an associated security engine that provides distributed transaction processing functions, such as networking interactions with the client end-user, and identification and authentication functions in HTTP and Web Services scenarios. The transaction-processing system or environment of this type typically also includes a mainframe component that includes at least a computer, operating system platform, applications, networking and associated security engine that provides high performance back-end transaction processing and large database functionality.

Monitored Server Security Systems

Figure 3:
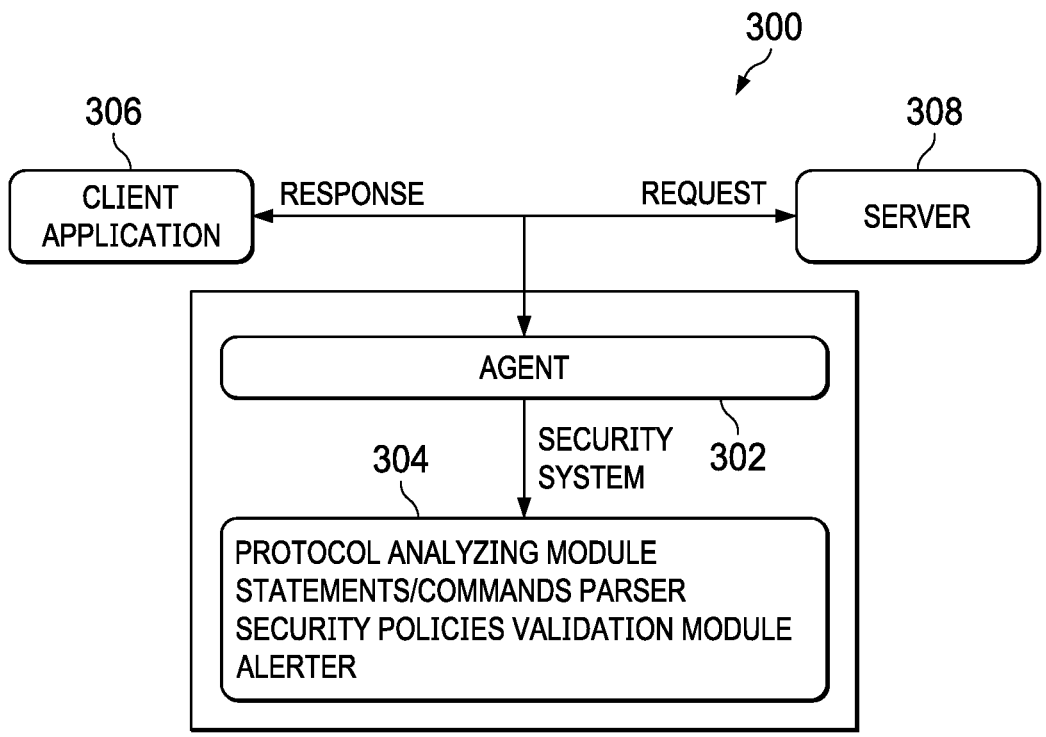
FIG. 3 depicts a generalization of a security system for monitoring a server in a client-server operating environment.

As described above, it is known to protect servers using intrusion detection. Security systems of this type typically analyze server access attempts by monitoring a network or local access to the server. FIG. 3 depicts a general solution of this type, which can also be implemented in association with a cloud service. As depicted, in this representative system 300 a client application 306 interacts with a server 308, and an agent 302 (which may be a proxy, or other monitoring functionality) operates to monitor both requests (to the server) and responses (from the server). The requests and responses are forwarded to a security mechanism 304. The security mechanism 304 typically includes various components, namely, a protocol analyzer module, a statements/commands (or "statement/command") parser, a policy validation module, and an alert module. Generally, the security mechanism is configured to examine the requests and the responses.

In particular, the agent 302 is configured to examine the application protocol request or response. Such a request/response is represented in the form of application protocol structure. Different types of clients/servers use different application protocol and statements/commands languages, although typically the request and response flow is common. Typically, a request contains application protocol metadata. The protocol analyzing module extracts a statement/command from the request. To this end, the protocol analyzing module needs to be aware of the applicable application protocol structures. Statements/commands extracted by the protocol analyzing module are then passed to the statement/command parser for evaluation. The statement/command parser may successfully parse the statement/command extracted by the protocol analyzing module, in which case the statement is then evaluated against one or more security policies. As also previously described, in certain situations, however, the statement/command parser cannot successfully parse the statement/command extracted by the protocol analyzing module. This operating scenario is addressed by the technique of this disclosure, as will be described below.

Figure 4:
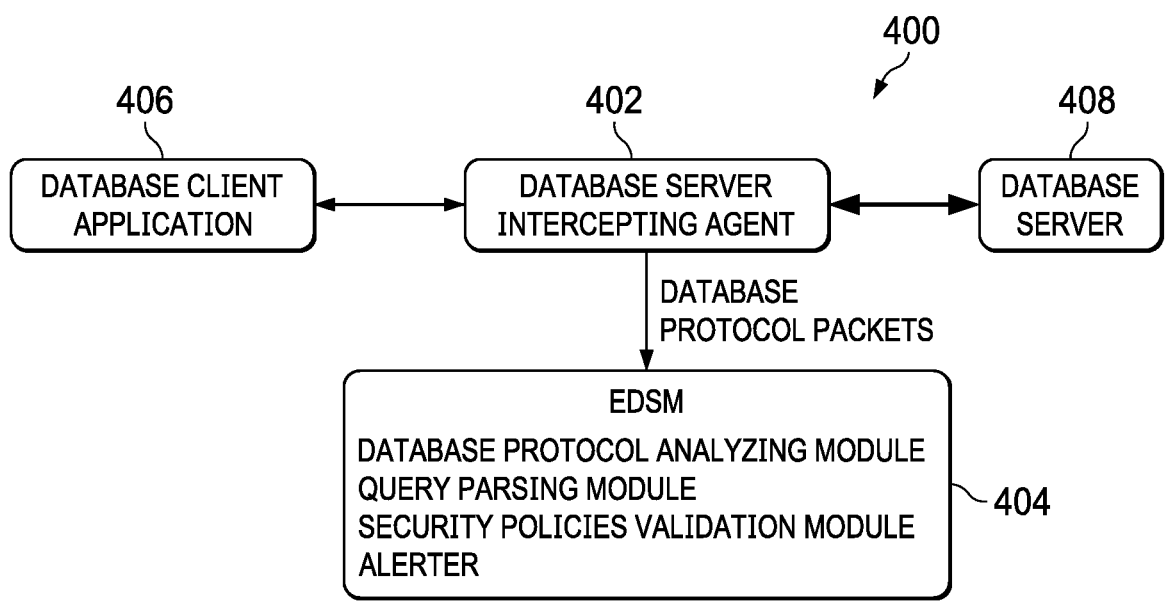
FIG. 4 depicts an access control system (e.g., for a database) that is structured with a security mechanism in accordance with the technique shown in FIG. 3.

By way of additional background, FIG. 4 depicts the basic operation of a database access control system 400 that comprises a database server intercepting agent 402 and an associated database security mechanism, e.g., an external-to-database security mechanism (EDSM) 404. As a skilled person will appreciate, the access control system in FIG. 4 is a special case of the generalized security system architecture depicted in FIG. 3. As depicted in FIG. 4, in this embodiment the agent 402 is situated in-line between a database client application 406, and a database server 408. Typically, database client communicates with the agent over a secure transport link (e.g., SQL/TCP/TLS), and the agent communicates with the server over a similar link. As noted above, one example commercial system of this type is IBM Guardium, in which the agent 402 is implemented as a lightweight software agent (S-TAP) installed on a database server system. The identification of this commercial system is not intended to be limiting.

Queries initiated to the database server 408 by the database client application 406 are intercepted by agent 402, and database protocol packets comprising those queries are forwarded to the EDSM 410 for evaluation. In this embodiment, the intercepting agent 402 typically also monitors the responses received from the database server 408. Typically, a database protocol packet refers to a formatted unit of data used in communication between the database client application and the database server. The semantics of the database protocol typically are dependent on the database provider and the database application, and these protocol semantics typically vary by vendor.

As is known, EDSM 410 typically includes several modules, e.g., a database protocol analyzing module, a query parsing module, a security policy validation module, and an alerting module. These modules typically are implemented as software executing in hardware. One core function of the EDSM is to extract the database query that is sent by the database client application 406 to the database server 408 and intercepted by the agent 402, parse this query up to a database object level, validate it (for potential database object access violations) against one of more EDSM security policies. Typically, the security policies comprise a set of security rules that define how to handle security violations. Example security rules include alerting users about access to the database objects (e.g., tables, views, procedures, etc.) from unauthorized users. If an access violation is detected, the EDSM issues an alert to this effect, or takes some other notification, mitigation or remediation function.

Figure 5:
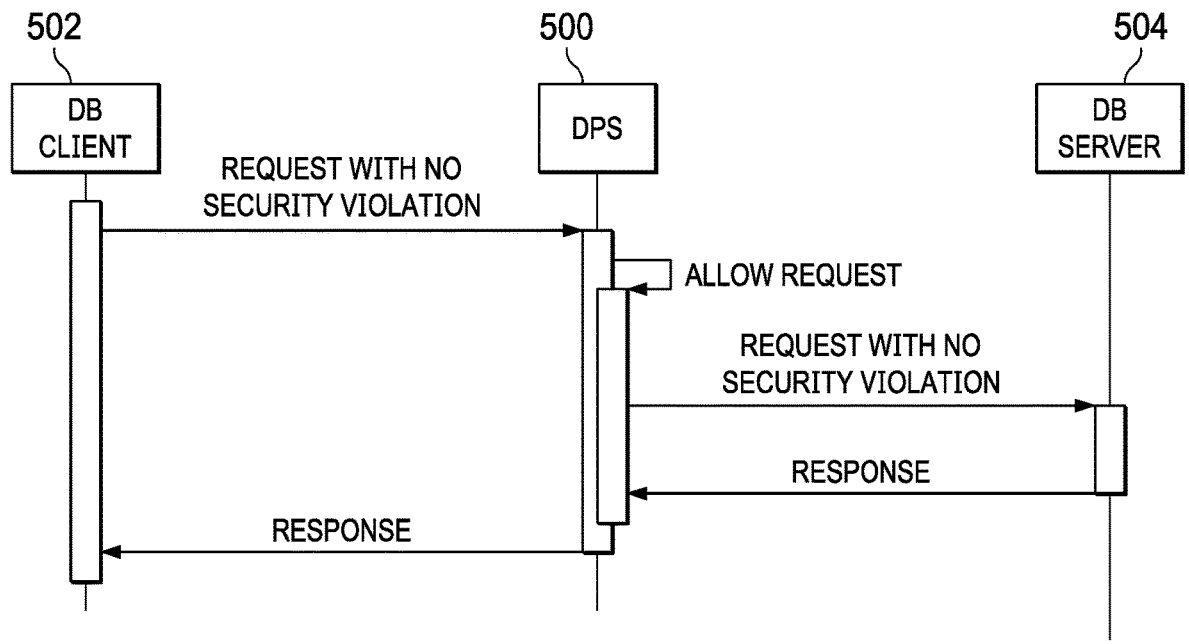
FIG. 5 depicts a Database Protection Solution/system in which the techniques of this disclosure may be implemented.

FIG. 5 depicts a representative operation of a database protection solution/system (DPS) when a database request does not involve a security violation. It should be appreciated that the nomenclature "security violation" is not intended to be limiting. The DPS may be configured to identify an actual violation (e.g., of some configured security policy), or the DPS may simply observe an operation that it determines to be "anomalous" or other suspicious. In this example, the DPS 500 is positioned intermediate a database client 502, and a database server 504 (corresponding generally to the configuration shown in FIG. 3). As has been described, the DPS typically operates by intercepting the traffic between the endpoints, namely, database queries from the client, and database responses from the server. The DPS 500 maintain a set of security rules (one or more security policies) defining how to handle each security situation. An example security rule includes suspending the database application and releasing the database server resources for application connection where access to one or more database objects is not authorized by the security rules. The DPS 500 may correspond to the agent and EDSM components in FIG. 4, or it may be operated or configured as a separate computing system. It is not required to have knowledge or logic to assemble database protocol structures.

As depicted, the database client 500 issues a request, in this case one that (when intercepted and evaluated by the DPS) will not trigger a security violation determination. The DPS 500 thus allows the request to pass through to the database server 504 over the connection depicted. The database server 504 returns a response, and that response is then passed through the DPS and returned to the database client 502 over the connection, which is then closed.

As previously described, the DPS mechanism 500 includes logic to terminate the database connection, however, when a security anomaly/violation is identified.

Another way of characterizing the DPS is that it acts as a security rule enforcement point for the database connections.

Runtime Detection of Database Protocol Metadata Anomalies in Database Client Connections As described above, a database protection system (DPS) is augmented according to this disclosure to provide additional functionality to provide real-time detection of anomalies that may not be recognized by a set of security rules that are configured for the system. To this end, and in lieu of using discrete security rules, the system herein implements a machine learning-based approach.

Figure 6:
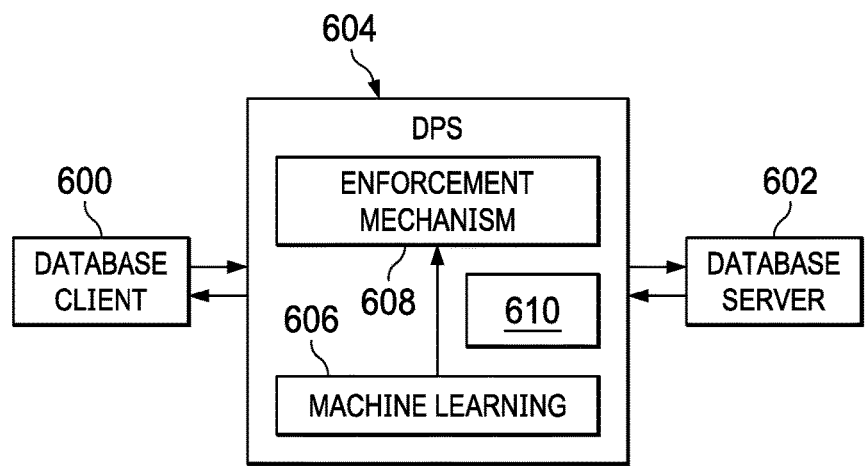
FIG. 6 depicts a DPS architecture that is augmented to utilize a machine learning-based approach according to the technique of this disclosure.

The basic architecture is depicted in FIG. 6. As shown, database client(s) 600 connect to the database server(s) 602 via the DPS 604, which is this case includes a machine learning module 606, and an associated enforcement mechanism 608. As will be described, the machine learning module 606 trains a machine learning model 610, which model is then used by the enforcement mechanism to detect anomalies. The machine learning-based approach herein may be used in lieu of or to supplement conventional rule-based approaches (as described above in connection with FIG. 4) that use security rules to search for a specific anomalous patterns. As described above, the approach herein is premised on the notion that DPM parameters are not independent, and that their conditional dependencies (as observed from the database connections) can be leveraged for anomaly detection. To that end, and according to the approach herein, the machine learning model 610 is trained (by mining database connection data) to detect dominant (repeating) patterns of connection DPM parameters. Once trained, the model is instantiated in the DPS enforcement mechanism 608 and used to facilitate anomaly detection by identifying connections that do not conform to these patterns, i.e. that represent unusual connection DPM parameters.

Figure 7:
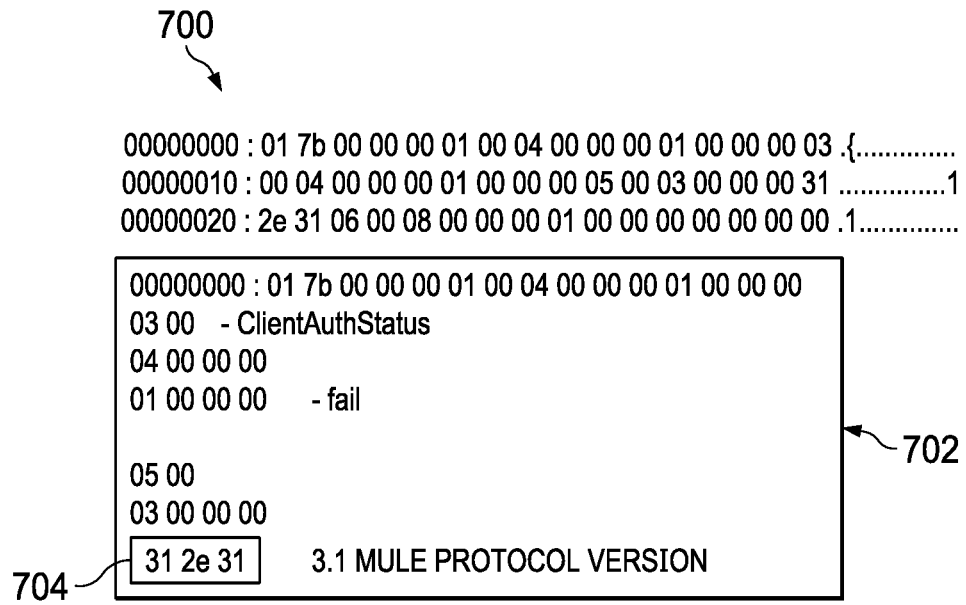
FIG. 7 depicts a representative database protocol packet that is examined to identify database protocol-specific metadata.

In particular, and according to this disclosure, the machine learning model 606 is trained on a set of database protocol metadata (DPM) that the system collects during its runtime operations (in which the connections are actively monitored by the DPS). As used herein, database protocol metadata (DPM) refers to a set of parameters that are protocol-specific. Typically, these nature, type and scope of this parameter set are dependent on the internal API that is used to establish the database connections. The DPMs are not generally exposed (or necessarily discoverable) by the database end users. Representative DPM parameters include, for example, the identity of which bit is set when a connection belongs to a super user, the particular code location that contains a client time zone, the particular code corresponding to the protocol type or version, a code corresponding to a driver version, and many more. Another specific DPM parameter example is depicted in FIG. 7. This drawing depicts a portion of a database protocol packet 700 intercepted by the DPS such as shown in FIG. 6. As also depicted, and in this example, this packet excerpt contains a set of protocol information 702 including data 704 about the use (in the example scenario) of "mule database protocol version 3.1." In this example, the mule protocol version data is one of the parameters describing the internals of a JDBC (Java Database Connectivity) driver used by the client application to query the database server. Assume, however, that the machine learning model has been trained to learn that all JDBC drivers of this organization actually internally use mule protocol versions 3.2 and 3.3; in such case, the packet 700 represents (or may be considered to represent) an anomalous (or potentially anomalous) database connection. The DPS may then be configured to take a particular action, e.g., investigate the connection, block the connection, sandbox the connection, etc., depending on how the system is configured to respond to such anomalies.

The above is just one example of how DPM parameter anomalies are identified using an appropriately-trained machine learning model. Generalizing, the approach herein uses a modeling-based approach to identity and investigate cases of database client connections that have inconsistent DPM parameters with respect to a set of such parameters that have been learning from a pool of database client connections used to train the model. As opposed to using a rule-based approach, the technique herein provides for run-time detection of any case (typically, a database client connection) that does not conform to the dominant patterns of DPM parameter dependencies that have been observed (learned by the model) in the database connections. A preferred implementation of the modeling uses a Bayesian model, although this is not a limitation. As is known in the art, Bayesian inferencing is a method of statistical inference in which Bayes' theorem is used to update a probability for a hypothesis as more evidence or information becomes available. Formally, Bayesian inference derives a posterior probability as a consequence of a prior probability, and a likelihood function derived from a statistical model for the observed data. Bayesian inference computes the posterior probability according to Bayes' theorem.

Figure 8:
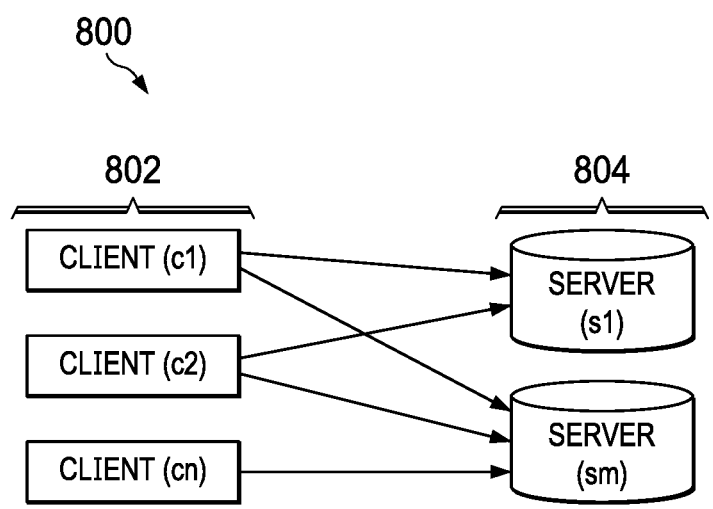
FIG. 8 depicts a representative system architecture in which machine learning may be implemented to learn connection DPM parameters.

The basic operation of the technique herein is now described by way of several examples. Referring to FIG. 8, assume that the security system monitors database connections with respect to the system architecture that comprises clients 800, and database servers 802. In this example organization, database client applications reside on client computers $C=\{C_1, C_2, \ldots, C_n\}$ and database services reside on server computers $S=\{S_1, S_2, \ldots, S_n\}$. Normally, multiple connections $c_j$ to services are opened and closed independently on the client computers $C_i$. Such connections represent random events. Typically, connection $c_j$ is a function of one or more DPM parameters: $c_j=f(p_1, p_2, \ldots, p_k)$. For example, an illustrative subset of DPM parameters that can be intercepted by DPS as part of the database protocol include client IP address (CIP), service type (ST), server IP address (SIP), application protocol (AP), authentication type (AT), client network protocol (CNP), client time zone (CTZ), client super user (CSU), and many more. In practice, the DPM connection parameters are not independent. For example, typically a server IP address (SIP) depends on the service type (ST) because services are installed on some servers but not necessarily all. Likewise, the type of application protocol (AT) often depends on the service type (ST).

Now, consider the following examples, which each represent possible DPM anomalies related to the above-described subset of DPM parameters. A first example is as follows. Normally, client IP address (CIP) correlates with client time zone (CTZ); thus, it may be suspicious to find that the time zone related to a particular CIP suddenly changes. In a second example, suppose that a database client connection from some CIP to some service (SIP and ST) is normally created by a regular database user. Now, assume that same user makes a database connection request with elevated administrative privilege (CSU); such a connection is anomalous and should be investigated. As another example, assume that a user makes a database connection to the database server over a less common database protocol that is regularly used for the server. This may indicate a possible intrusion attempt.

Figure 9:
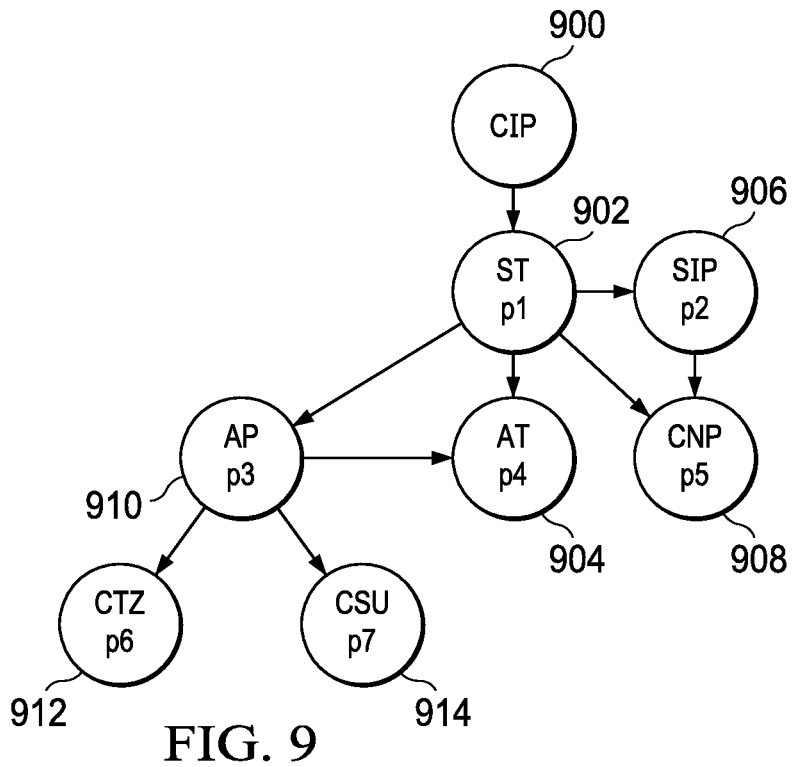
FIG. 9 depicts a representative directed acyclic graph (DAG) representing a set of DPM parameter relationships, e.g., for the system architecture in FIG. 8.

The first example scenario above is illustrated in FIG. 9 in the form of a Bayesian network graph. Formally, Bayesian networks are directed acyclic graphs (DAGs) whose nodes represent variables that may be observable quantities, latent variables, unknown parameters or hypotheses. Edges in a DAG represents conditional dependencies. Nodes that are not connected to one another (i.e., no path connects one node to another) represent variables that are conditionally independent of each other. Each node is associated with a probability function that takes, as input, a particular set of values for the node's parent variables, and gives (as output) the probability (or probability distribution, if applicable) of the variable represented by the node. In FIG. 9, the directed acyclic graph (DAG) comprises CIP node 900 to which ST node 902 is connected. AT node 904 is connected to ST node 902. In addition, SIP node 906 and CNP node 908 both connect to ST node 902, and CNP node 908 also connects to SIP node 906. An AP node 910 connects to ST node 902, as well as to AT node 904. CTZ node 912 and CSU node 914 also connect to AP node 910. Thus, in this example scenario the graph comprises seven (7) second level DPM vertices $p_1, p_2, \ldots p_7$ and satisfies a Markov condition, which is an assumption made in Bayesian probability theory, namely, that every node in a Bayesian network is conditionally independent of its non-descendent nodes, given its parents. Continuing with this example, a full discrete joint representation is then calculated by the following: $P(CIP, p_1, \ldots, p_7) = P(p7|p3) \cdot P(p6|p3) \cdot P(p4|p1,p3) \cdot P(p3|p1) \cdot P(p5|p1,p2) \cdot P(p2|p1) \cdot P(p1|CIP) \cdot P(CIP)$.

In this manner, conditional probabilities of DPM parameters are calculated by DPS using connection information intercepted as runtime. These probabilities are then used to compute probability values from which DPS can then discriminate new connections to discover potential anomalous behavior. In particular, typically lower joint probability values (as compared to the baseline values determined the machine learning) identify anomalous connections.

The following provides additional details of the above-described scoring and discrimination methodology works in practice.

Figure 10:
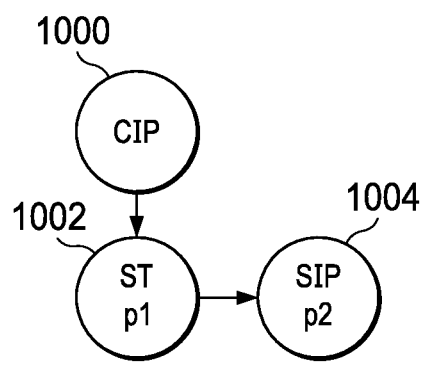
FIG. 10 depicts a subset of the graph in FIG. 9.
Figure 11:
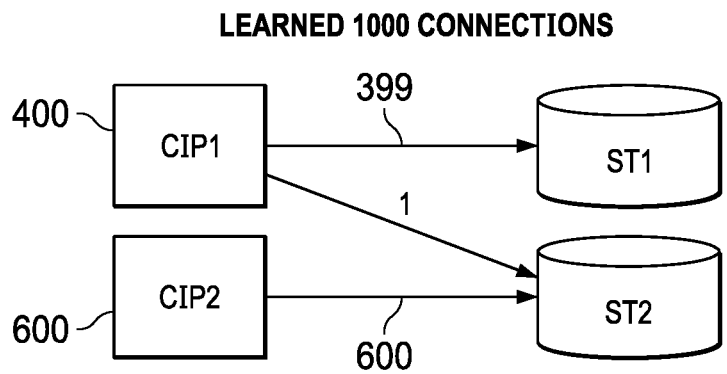
FIG. 11 depicts a first set of learned connections identified by the machine learning module with respect to pair of nodes in the graph shown in FIG. 10.
Figure 12:
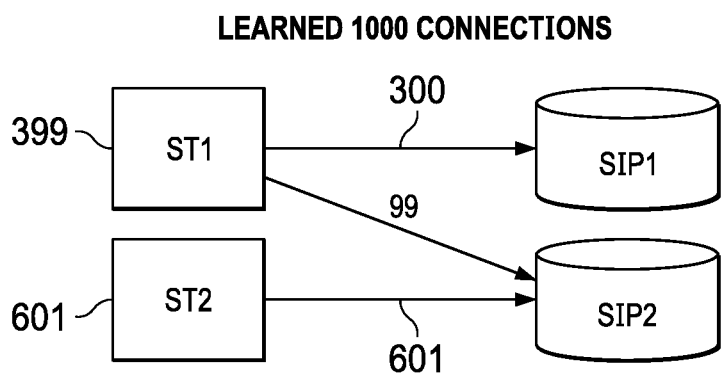
FIG. 12 depicts a second set of learned connections identified by the machine learning module with respect to another pair of nodes in the graph shown in FIG. 10.

FIG. 10 depicts a simplified DPM, which is a sub-graph of the graph shown in FIG. 9. As depicted, the graph comprises three (3) nodes: CIP 1000, ST 1002, and SIP 1004. Now, suppose the organization comprises two (2) client hosts and two (2) server hosts. The relationships among nodes CIP 1000 and ST 1002 (from FIG. 10) are depicted in FIG. 11, and the relationships among nodes ST 1002 and SIP 1004 are depicted in FIG. 12. The database clients in this example are represented by their IP addresses, say CIP1=192.168.10.10, and CIP2=192.168.10.11. The servers are represented by their IP addresses, e.g., SIP1=192.168.10.100 and SIP2=192.168.120.101. Assume there are two (2) types of services that can be installed on the server hosts, e.g., ST1=ORACLE, and ST2=SYBASE. Then, in this example, the joint distribution for the graph shown in FIG. 9 is as follows: $P(CIP,ST,SIP) = P(SIP|ST) \cdot P(ST|CIP) \cdot P(CIP)$. Now, suppose that during the learning phase the DPS intercepts 1000 database connections among the various hosts CIP1, CIP2, SIP1 and SIP2, with the numerical distribution of such connections shown in FIG. 11 (for the CIP-ST relationships). Accordingly, the DPS calculates DPM conditional probabilities related to the graph (in FIG. 10) as follows:

$$P(CIP1) = 0.4; P(CIP2) = 0.6;$$

$$P(ST1 \mid CIP1) = \frac{399}{400} = 0.998; P(ST2 \mid CIP1) = \frac{1}{400} = 0.002;$$

$$P(ST1 \mid CIP2) = \frac{0}{600} = 0; P(ST2 \mid CIP2) = \frac{600}{600} = 1).$$

At the same time, and for the ST-SIP relationships in FIG. 12, the following conditional probabilities related to the graph (in FIG. 10) are computed as follows:

$$P(ST1) = \frac{399}{1000} = 0.399; P(ST2) = \frac{601}{1000} = 0.601;$$

$$P(SIP1 \mid ST1) = \frac{300}{399} = 0.752; P(SIP2 \mid ST1) = \frac{99}{399} = 0.248;$$

$$P(SIP1 \mid ST2) = \frac{0}{601} = 0; P(SIP2 \setminus ST2) = \frac{601}{601} = 1.$$

Figure 13:
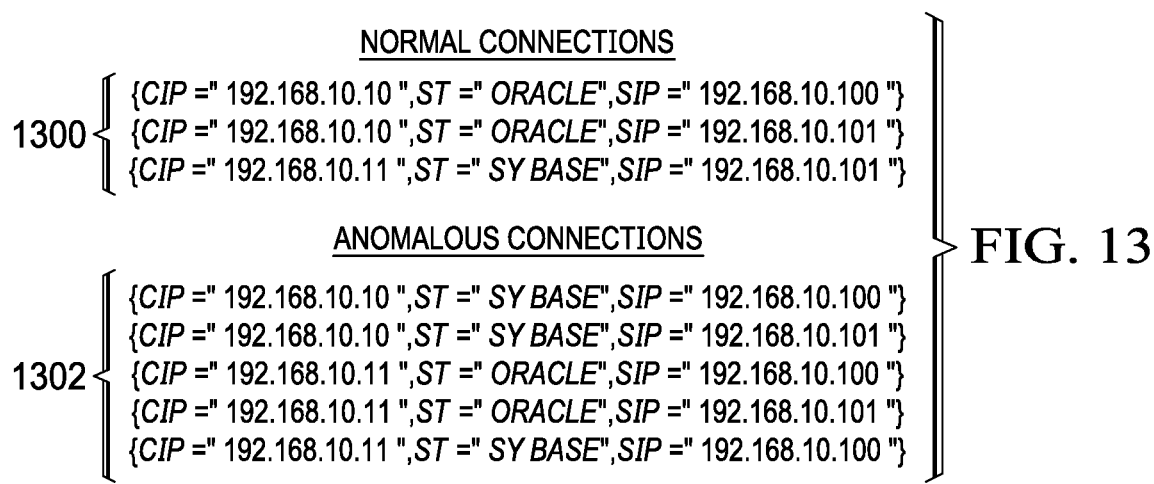
FIG. 13 depicts how the enforcement mechanism in FIG. 6 uses joint distribution values (computed from the sets of learned connections) to discriminate normal and anomalous connections.

As a result, the joint distribution (for all nodes in the graph in FIG. 19) is then computed in the training phase as follows: $P(CIP1,ST1,SIP1) = 0.752 \cdot 0.998 \cdot 0.4 = 0.3$; $(CIP1,ST1,SIP2) = 0.248 \cdot 0.998 \cdot 0.4 = 0.099$; $P(CIP1,ST2,SIP1) = 0$; $P(CIP1,ST2,SIP2) = 1 \cdot 0.002 \cdot 0.4 = 0.001$; $P(CIP2,ST1,SIP1) = 0$; $P(CIP2,ST1,SIP2) = 0$; $P(CIP,ST2,SIP1) = 0$; $P(CIP2,ST2,SIP2) = 1 \cdot 1 \cdot 0.6 = 0.6$. Evaluating these joint probabilities, and with reference to FIG. 13, the database connections 1300 are determined to be normal, whereas the database connections 1302 may represent anomalies that DPS should then investigate.

The examples scenarios identified above are not intended to be limiting.

Thus, according to this disclosure the machine learning monitors active connections in the database system to "learn" the DPM parameter connection probabilities, and to compute the joint distribution probabilities. These distribution probabilities represent the machine learning model that is then applied for discrimination. The model (namely, the distribution probabilities) may be computed periodically or on-demand, upon a given occurrence, as servers are added or removed from the system, and so forth. The model thus be periodically or continuously updated, e.g., as connection information and, in particular, new data supporting the determined DPM parameters, is received or otherwise ascertained. Once trained, a model of joint distribution probabilities for the DPM parameters is then used to discriminate a particular connection as being potentially anomalous. The approach works without requiring access to or use of hard-coded security rules, and it accurately detects low probability events as being potentially anomalous that might not otherwise be captured by a rules-based DPS.

The machine learning and/or its associated enforcement mechanism can be implemented as an adjunct to an existing DPS.

The subject matter herein provides numerous advantages. Because DPMs are not generally exposed to the database end users, a malicious user cannot readily imitate DPM parameter (let alone their dependencies) in database client connections without deep knowledge of organization network flows. The technique works to detect connection anomalies "on-the-fly," and the machine learning-based approach described herein can be used for a wide range of application layer protocols, including encryption protocols like TLS/SSL. More generally, this approach thus provides for improvements to a database access control system that provides for efficient anomaly detection without reliance on use of hard-coded (static) security rules.

In a typical embodiment, the machine learning and related functionality is implemented as computer software (a set of computer program instructions configured as program code) executed by computer hardware. Individual functions may be combined/integrated or separate from another, and the particular functions may be co-located or distributed in whole or in part. Of course, the nomenclature used herein to describe these functions is not intended to be limited.

Generalizing, the enhanced DPS functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in a loosely-coupled server (including a "cloud"-based) environment. The security server itself (or functions thereof, such as the monitor process) may be hosted in the cloud. As already mentioned, a representative commercial DPS in which the described technique may be implemented is IBM® Guardium® DPS, but this is not a limitation. More generally, the technique is implemented at any enforcement point inspecting (for security rule validation) multiple database connections.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the DPS, or the agent and EDSM components, as the case may be, are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the DPS (or agent/EDSM) described above.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques disclosed herein are not limited to a multi-component transaction processing environment, but this will be a typical implementation. As noted, the above-described function may be used in any system, device, portal, site, or the like wherein server-set session management data might be re-used (either by an original user in a different session, or by another user) through the same client browser.

The session information retrieval technique described herein is not limited for use with any particular database access protocol, and it may be applied in other database access schemes generally. Thus, while the depicted approach is a preferred operating environment, the approach may be implemented in any database access scheme wherein database client requests are processed for potential security violations in the manner described.

The techniques herein provide for improvements to another technology or technical field, namely, database access control systems, as well as improvements to the operational capabilities of such systems when used in the manner described.

Typically, the machine learning is carried out to identify DPM parameters with respect to the client connections to the DPS, but this is not a limitation. The learning may also be based on server connections to the DPS, or combinations of both client and server connections.

While a Bayesian modeling approach is preferred, this is not a limitation. Other machine learning approaches may be used. These include other clustering methods.

As noted above, while the technique has been described in the context of a database protocol, the same principles (namely, machine learning protocol-specific metadata and computing joint distribution probabilities, and then using those probabilities for discriminating normal versus abnormal connections or communications using the protocol) may be applied to other application layer protocols.

The notion of real-time anomaly detection as referenced above is not intended to require some fixed temporal period. Thus, as used herein, real-time is also intended to described events or occurrences that are relatively near in time.

Having described the subject matter herein, what we claim is as follows:

1. A method to detect anomalous database connections, comprising:
    monitoring runtime connections associated with one or more database clients;
    responsive to the monitoring, identifying database protocol metadata (DPM), the database protocol metadata comprising a set of DPM parameters;
    for each of one or more subsets of the DPM parameters, applying machine learning to values associated with the database protocol metadata, and outputting a model, wherein the model comprises a joint distribution probability associated with a particular one of the subsets of DPM parameters; and
    identifying a new database connection as anomalous based on the model.

2. The method as described in claim 1 wherein identifying the new database connection as anomalous computes a value of a joint probability for the particular one of the subsets of DPM parameters for the new database connection and compares the computed joint probability value to the joint distribution probability in the model.

3. The method as described in claim 1 further including generating a directed acyclic graph (DAG) associating a least a first DPM parameter and a second DPM parameter.

4. The method as described in claim 3 wherein the first and second DPM parameters are dependent on one another and have conditional dependencies, wherein the joint distribution probability for the subset comprising the first and second DPM parameters is based on the conditional dependencies.

5. The method as described in claim 1 wherein the new database connection is identified as anomalous on-the-fly and without analysis of a security rule.

6. The method as described in claim 1 wherein the database protocol metadata is internal metadata describing a property or attribute of the database protocol connection.

7. The method as described in claim 1 wherein the model output by the machine learning is a Bayesian model.

8. Apparatus configured to detect anomalous database connections, comprising:
    a processor;
    computer memory holding computer program instructions executed by the processor, the computer program instructions comprising program code configured to:
        monitor runtime connections associated with one or more database clients;
        responsive to the monitoring, identify database protocol metadata (DPM), the database protocol metadata comprising a set of DPM parameters;
        for each of one or more subsets of the DPM parameters, apply machine learning to values associated with the database protocol metadata, and outputting a model, wherein the model comprises a joint distribution probability associated with a particular one of the subsets of DPM parameters; and
        identify a new database connection as anomalous based on the model.

9. The apparatus as described in claim 8, wherein the program code configured to identify the new database connection as anomalous further comprises program code configured to:
    compute a value of a joint probability for the particular one of the subsets of DPM parameters for the new database connection; and
    compare the computed joint probability value to the joint distribution probability in the model.

10. The apparatus as described in claim 8 wherein the program code is further configured to generate a directed acyclic graph (DAG) associating a least a first DPM parameter and a second DPM parameter.

11. The apparatus as described in claim 10 wherein the first and second DPM parameters are dependent on one another and have conditional dependencies, and wherein the joint distribution probability for the subset comprising the first and second DPM parameters is based on the conditional dependencies.

12. The apparatus as described in claim 8 wherein the new database connection is identified as anomalous on-the-fly and without analysis of a security rule.

13. The apparatus as described in claim 8 wherein the database protocol metadata is internal metadata describing a property or attribute of the database protocol connection.

14. The apparatus as described in claim 8 wherein the model output by the machine learning is a Bayesian model.

15. A computer program product in a non-transitory computer readable medium, the computer program product holding computer program instructions executed by a processor in a data processing system to detect anomalous database connections, the computer program instructions comprising program code configured to:
    monitor runtime connections associated with one or more database clients;
    responsive to the monitoring, identify database protocol metadata (DPM), the database protocol metadata comprising a set of DPM parameters;
    for each of one or more subsets of the DPM parameters, apply machine learning to values associated with the database protocol metadata, and outputting a model, wherein the model comprises a joint distribution probability associated with a particular one of the subsets of DPM parameters; and
    identify a new database connection as anomalous based on the model.

16. The computer program product as described in claim 15 wherein the program code configured to identify the new database connection as anomalous further comprises program code configured to:
    compute a value of a joint probability for the particular one of the subsets of DPM parameters for the new database connection; and
    compare the computed joint probability value to the joint distribution probability in the model.

17. The computer program product as described in claim 15 wherein the program code is further configured to generate a directed acyclic graph (DAG) associating a least a first DPM parameter and a second DPM parameter.

18. The computer program product as described in claim 17 wherein the first and second DPM parameters are dependent on one another and have conditional dependencies, and wherein the joint distribution probability for the subset comprising the first and second DPM parameters is based on the conditional dependencies.

19. The computer program product as described in claim 15 wherein the new database connection is identified as anomalous on-the-fly and without analysis of a security rule.

20. The computer program product as described in claim 15 wherein the database protocol metadata is internal metadata describing a property or attribute of the database protocol connection.

21. The computer program product as described in claim 15 wherein the model output by the machine learning is a Bayesian model.

22. A method to detect anomalous activity associated with an application layer protocol, comprising:
    monitoring runtime connections associated with one or more clients or services that use the application layer protocol;
    responsive to the monitoring, identifying protocol-specific metadata comprising a set of protocol-specific parameters at least some of which have conditional dependencies;
    for each of one or more subsets of the protocol-specific parameters, applying machine learning to values associated with the protocol-specific metadata, and outputting a model, wherein the model comprises a joint distribution probability associated with a particular one of the subsets of protocol-specific parameters; and
    identifying a new connection as anomalous based on the model.

* * * * *